United States Patent
Hu et al.

(10) Patent No.: US 7,302,109 B2
(45) Date of Patent: Nov. 27, 2007

(54) METHOD AND SYSTEM FOR IMAGE PROCESSING FOR STRUCTURED LIGHT PROFILING OF A PART

(75) Inventors: Qingying Hu, Clifton Park, NY (US); Kevin George Harding, Niskayuna, NY (US); Joseph Benjamin Ross, Cincinnati, OH (US); Peter William Lorraine, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 847 days.

(21) Appl. No.: 10/652,366

(22) Filed: Aug. 28, 2003

(65) Prior Publication Data
US 2005/0046872 A1 Mar. 3, 2005

(51) Int. Cl.
*G06K 9/40* (2006.01)
(52) U.S. Cl. .................. 382/260; 382/274; 382/282; 382/284; 358/520; 358/538
(58) Field of Classification Search ............... 382/260, 382/274, 275, 282, 284, 294, 302; 358/1.7, 358/3.26, 3.27, 509, 520, 537, 738
See application file for complete search history.

(56) References Cited

U.S. PATENT DOCUMENTS

| | | | |
|---|---|---|---|
| 4,875,777 A | | 10/1989 | Harding |
| 5,430,810 A | * | 7/1995 | Saeki .................. 382/281 |
| 5,528,339 A | * | 6/1996 | Buhr et al. ............ 355/32 |
| 5,606,390 A | * | 2/1997 | Arai et al. ............ 396/51 |
| 5,644,390 A | * | 7/1997 | Yasuzato ............ 356/121 |
| 5,852,672 A | | 12/1998 | Lu |
| 5,999,840 A | | 12/1999 | Grimson et al. |
| 6,005,984 A | * | 12/1999 | Kawakami et al. ...... 382/276 |
| 6,483,641 B1 | * | 11/2002 | MacAulay .............. 359/385 |
| 6,563,945 B2 | * | 5/2003 | Holm ...................... 382/162 |
| 6,633,683 B1 | * | 10/2003 | Dinh et al. ............ 382/260 |
| 6,639,597 B1 | * | 10/2003 | Zwicker et al. ......... 345/427 |
| 6,782,137 B1 | * | 8/2004 | Avinash ................ 382/254 |
| 6,850,252 B1 | * | 2/2005 | Hoffberg .............. 715/716 |

OTHER PUBLICATIONS

EP 0425 5149, EP Search Report, Aug. 14, 2006.
M. R. Shortis et al., "A Comparison of Some Techniques for the Subpixel Location of Discrete Target Images", Dept. of Surveying & LandInformation, Univ. of Melbourne, SPIE vol. 2350, Videometrics III (1994), pp. 239-250.
R. J. Valkenburg et al., "An Evaluation of Subpixel Feature Localisation Methods for Precision Measurement", Machine Vision Grou, Industrial Research Limited, SPIE vol. 2350 Videometrics III (1994), pp. 229-238.
M. A. Michniewicz et al., "Advanced Line of Light Gage", RIA Conference Robots and Vision Automation, Detroit, Jun. 1990, pp. 14-10-14-23.

(Continued)

*Primary Examiner*—Yosef Kassa
(74) *Attorney, Agent, or Firm*—Penny A. Clarke; Patrick K. Patnode

(57) ABSTRACT

An image processing method for structured light profiling includes sampling an image of a structured light pattern to obtain an intensity distribution, selecting a number of sets of sampled points from the intensity distribution. Each of the respective sets includes a number of sampled points. The image processing method further includes fitting each of the sets of sampled points to a respective distribution function and filtering the distribution functions to select a representative distribution function for the intensity distribution.

27 Claims, 5 Drawing Sheets

OTHER PUBLICATIONS

K. Harding, "3D Laser Measurements on Scattering and Translucent Surfaces", SPIE Proceedings, vol. 2599, Industrial Technology Institute, Ann Arbor, MI, Oct. 1995, pp. 217-227.

K. Harding, "Speckle Reduction Methods for Laser Line Gages", SPIE vol. 3204, Industrial Technology Institute, Ann Arbor, MI, Oct. 1997, pp. 137-144.

* cited by examiner

METHOD AND SYSTEM FOR IMAGE PROCESSING FOR STRUCTURED LIGHT PROFILING OF A PART

BACKGROUND OF THE INVENTION

The present invention relates generally to structured light profiling of a part and more specifically to methods and systems for image processing to obtain a three dimensional profile of a part using a structured light source.

In structured light applications, a three dimensional profile of a part is obtained by using a laser source and at least one video camera. A laser source emanates a laser beam and spreads into multiple (one or more) laser stripes which strikes a surface of a part. These stripes are viewed from one or more video cameras from an angle other than the illumination angle. Typically, applications for structured light profiling include obtaining shape profile information about the part or generating a 3D contour map of the part.

The limitations of using laser stripes to obtain accurate profile information are mainly attributed to sampling error and the noise associated with the laser because the center of a laser stripe may not be imaged at the center of the pixel of the camera and may not be the detected intensity peak. Sampling error occurs while locating the center of the laser stripe on the image. There are image processing techniques such as maximum intensity, intensity center, Gaussian fitting and zero-crossing which attempt to extract the relevant information from the laser stripe. The associated problem with several of these techniques is that it gives the location of the highest peak, which is not the true center of the stripe. Current correction techniques for this error include neighborhood averaging over neighboring pixels and doing a weighted average or using fitting methods, but these techniques also fail to adequately address the sampling error.

The noise associated with the laser primarily takes the form of laser speckle, which is the oscillation of the intensity profile for a laser when it is reflected from the surface of the part and is caused by coherency of the laser. One way to reduce the speckle noise is by choosing an appropriate viewing system. By changing the size of the aperture, the size of the speckle changes, the larger the aperture, the smaller the size of the speckle. However, in this case there's a depth of field tradeoff.

Therefore there is need for an improved image processing technique for reducing the speckle noise and also the sampling error in structured light applications.

BRIEF DESCRIPTION OF THE INVENTION

Briefly, in accordance with one aspect of the present invention, an image processing method for structured light profiling includes sampling an image of a structured light pattern to obtain an intensity distribution. A number of sets of sampled points are then selected from the intensity distribution, where each of the respective sets includes a number of sampled points. Each of the sets of sampled points is then fitted to a respective distribution function. Finally, the distribution functions are filtered to select a representative distribution function for the intensity distribution.

In accordance with another aspect of the present invention, a system for obtaining a three dimensional profile of a part using a structured light pattern includes a source of structured light positioned at a predetermined distance from a part, where the source projects a beam of structured light to illuminate the part. The system also includes at least one imaging device configured to acquire an image of a structured light pattern of the part, where the at least one imaging device is positioned such that an angle of view of the imaging device is different from an angle of illumination of the source. A processor is coupled to the at least one imaging device, and the processor is configured for a variety of tasks including sampling the image of a structured light pattern to obtain an intensity distribution; selecting a number of sets of sampled points from the intensity distribution, where each of the sets includes at least three sampled points; fitting each of the sets of sampled points to respective Gaussian distribution functions; extracting a center for each of the Gaussian distribution functions; filtering the Gaussian distribution functions by using the centers to select a representative distribution function for the intensity distribution; and reconstructing a three dimensional profile of the part, using the representative distribution function.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
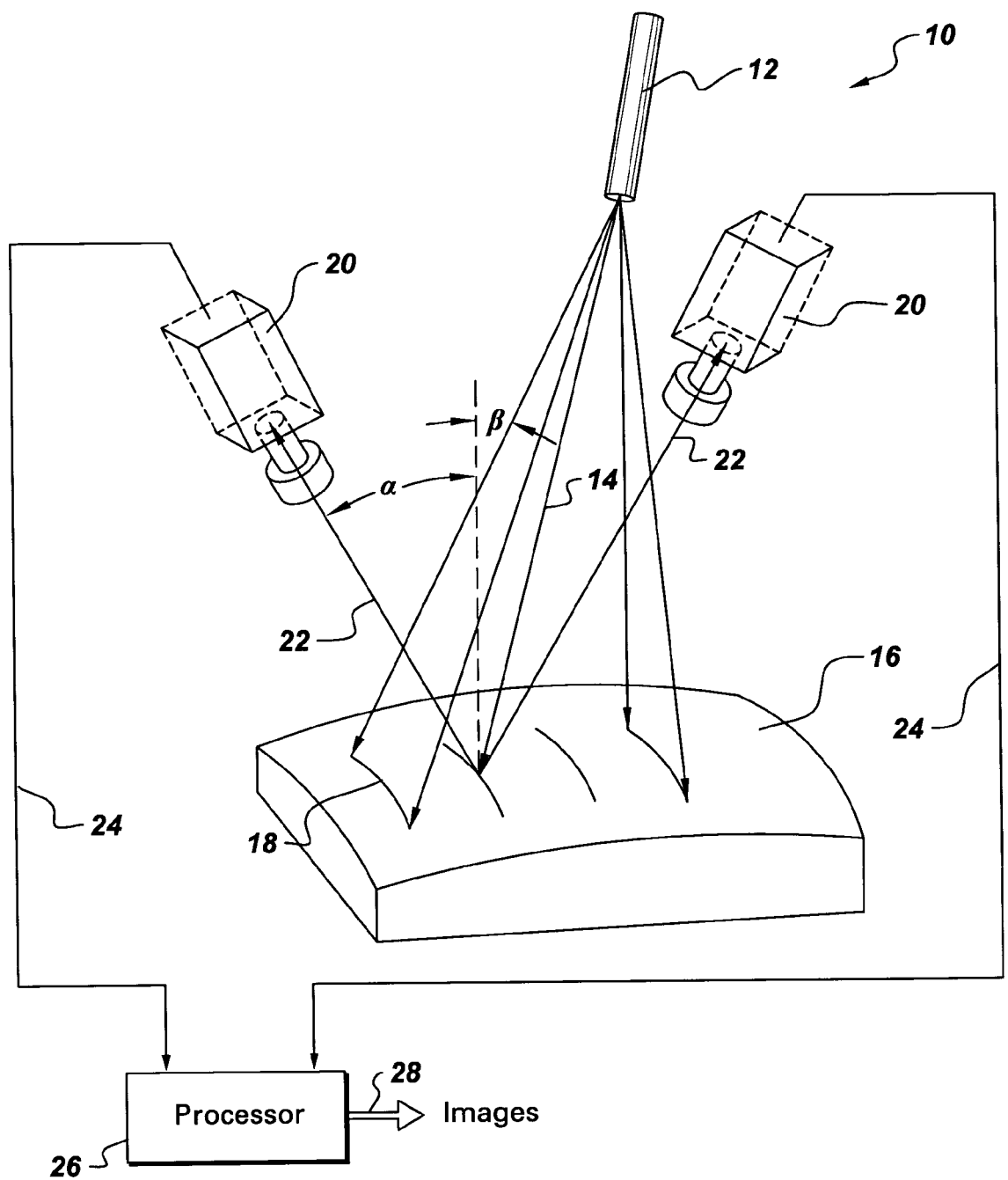
FIG. 1 illustrates a system for obtaining a three dimensional profile of a part using a structured light source.

FIG. 1 illustrates a system 10 for obtaining a three dimensional profile of a part 16 using a structured light pattern 18. The system includes a source 12 of structured light 14 positioned at a predetermined distance from a part. The source 12 projects a beam of structured light 14 to illuminate the part 16. In the illustrated embodiment, a laser is used as the structured light source 14. However other mediums like white light may also be used. At least one imaging device 20 is configured to acquire an image 28 of a structured light pattern of the part 16 by viewing along the direction 22. The imaging device 20 is positioned such that an angle of view ($\alpha$) of the imaging device 20 is different from an angle of illumination ($\beta$) of the source 12. A processor 26 is coupled through 24 to the imaging device 20 and is configured for reconstructing the three dimensional profile of the part using the methods described hereinbelow.

As would be appreciated by those skilled in the art, the intensity profile for a flat surface in the case of illumination with Gaussian profile by source 12 and any viewing angle of the imaging device 20, for any tilt angle (θ) of the surface of the part 16, remains a Gaussian distribution. For such a symmetric intensity profile on a flat surface, it will be well appreciated by those skilled in the art that sampling of the symmetric point and applying zero-crossing which is a second derivative on the profile, will yield the center corresponding to the maximum intensity.

Figure 2:
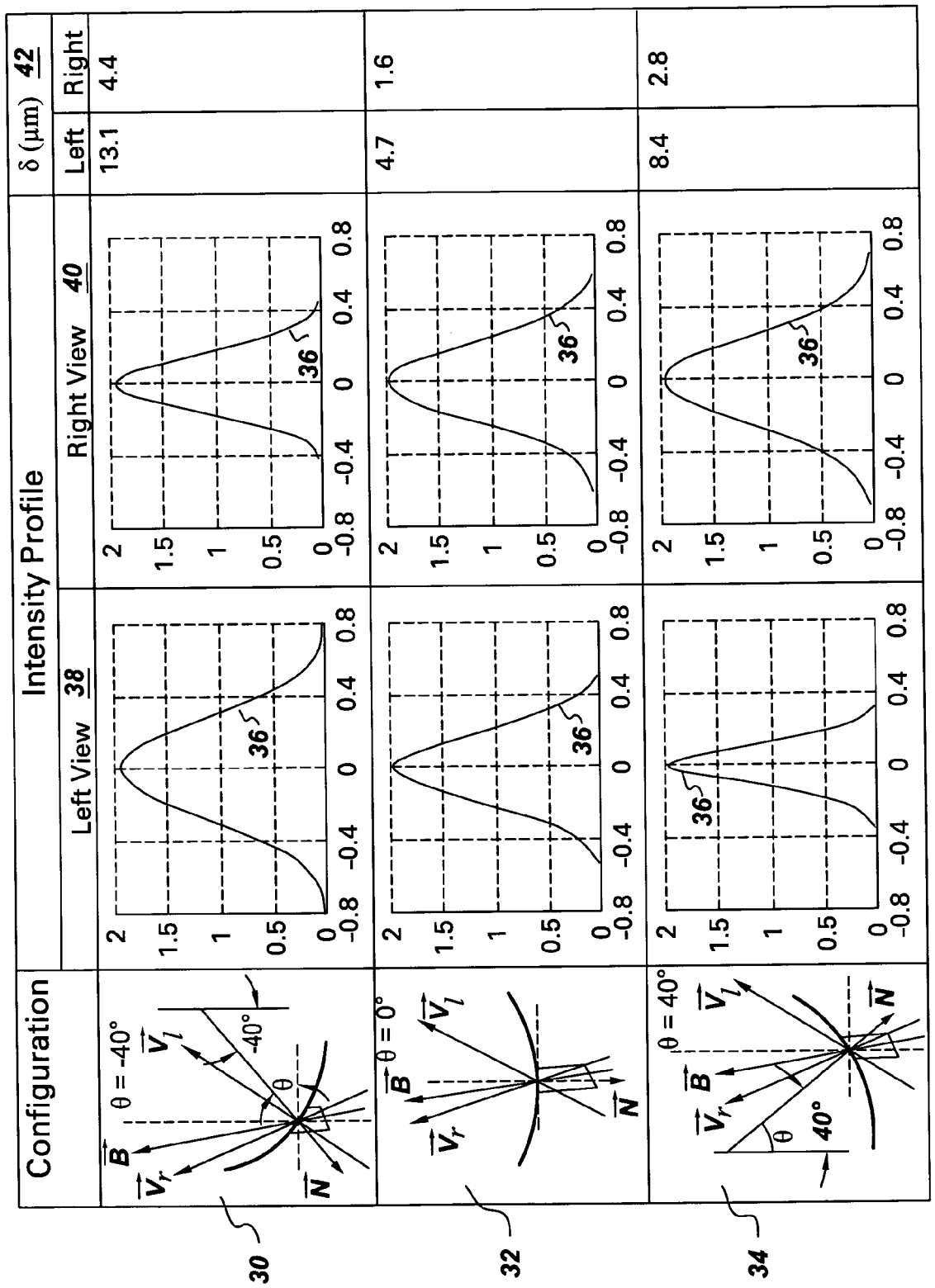
FIG. 2 illustrates a set of graphs for three different orientations of a curved surface being viewed by two cameras.

However, in the case of a complex part, where the surface is not flat, the intensity profile is no longer symmetric. In case of a curved surface, the curvature of the surface may be approximated by a cylinder to analyze the intensity profiles for a Gaussian distribution. It is found that the degree of asymmetry δ (the maximum distance difference between two points with the same intensity to the maximum intensity point) is small and hence the effect on image due to this asymmetry is small. Therefore the intensity profile near a cylindrical neighborhood in a curved surface can also be assumed to be a Gaussian distribution. In this case, considering that the maximum intensity point is sampled, the image bias after applying zero-crossing is also small, of the order of $10^{-2}$. This is shown by a set of graphs in FIG. 2, for three different orientations of a curved surface at angles −40 degrees, 0 degrees and 40 degrees being viewed by two cameras, with the views being depicted as a left view and a right view respectively. Also in FIG. 2, $\vec{V}$ is the viewing vector unit determined by viewing angle α, $\vec{N}$ is the surface normal unit determined by surface tilt angle θ and $\vec{B}$ is the vector unit of the beam center line determined by beam divergent angle β. The degree of asymmetry δ is shown in FIG. 2 for the left and right views for different tilt angles of the curved surface.

Figure 3:
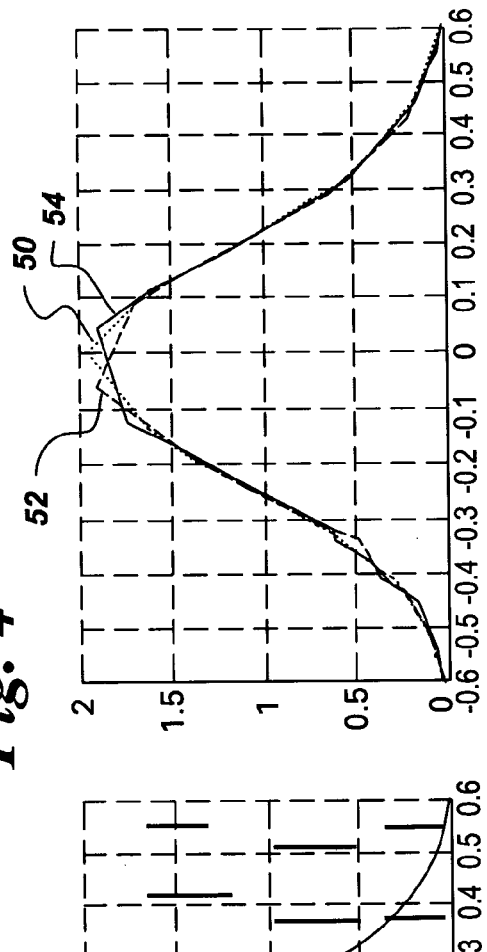
FIG. 3 is a graphical representation of a number of sampling points at three different locations of an intensity distribution.
Figure 4:
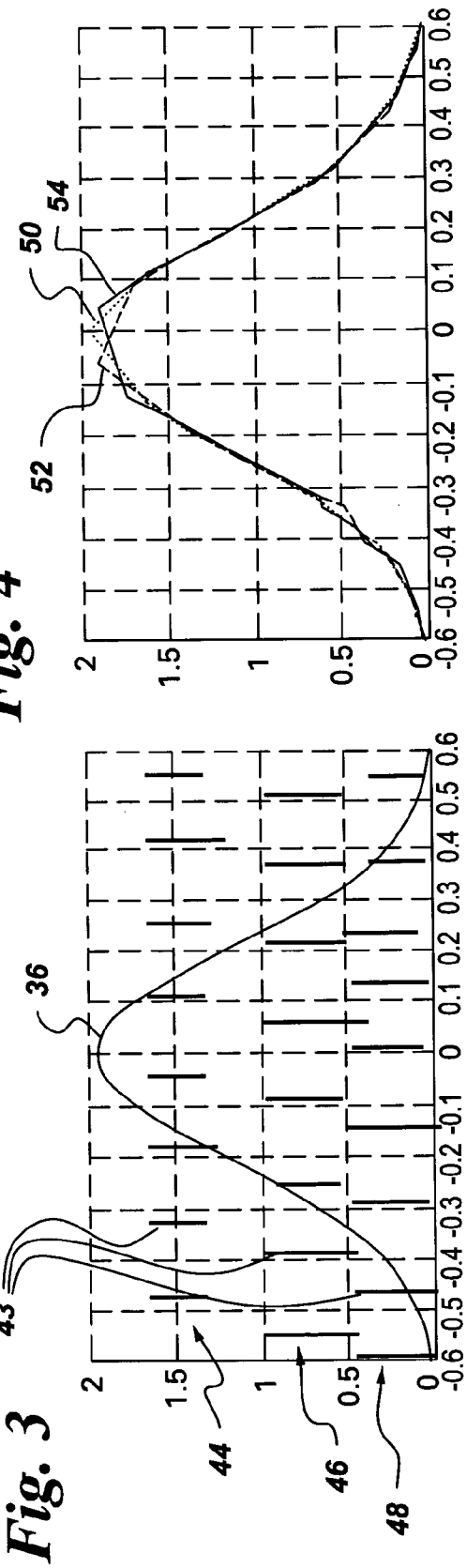
FIG. 4 is a graphical representation of sampled intensity profiles for the three locations illustrated in FIG. 3.
Figure 5:
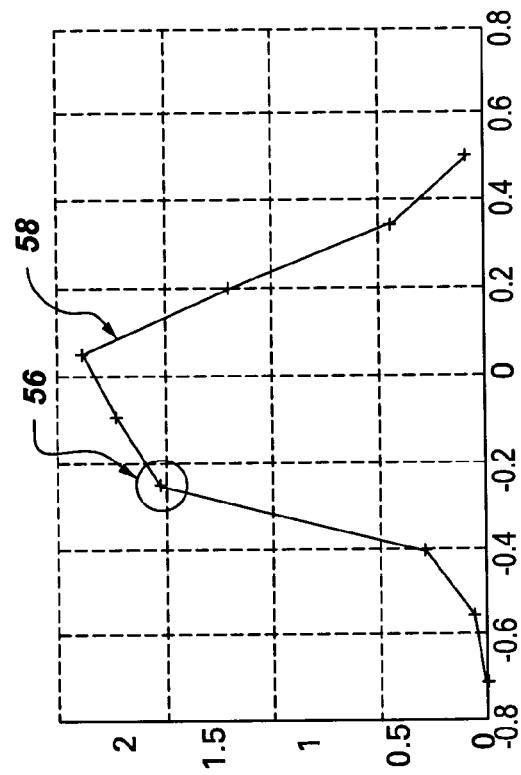
FIG. 5 is a graphical representation of a sampled intensity profile with speckle noise and sampling error.

However, if the maximum intensity point is not sampled, i.e. there is sampling error, zero-crossing does not give accurate results and leads to a larger image bias as shown by the set of graphical representations in FIG. 3 and FIG. 4. FIG. 3 depicts a number of sampling points 43 at three different locations 44, 46, 48 of an intensity distribution 36. FIG. 4 depicts the sampled intensity profiles 50, 52 and 54 for the locations 44, 46 and 48 respectively. These profiles 52 and 54 (as is clear from FIG. 4) are not a true representation of the intensity profile 36 due to the sampling error. Further, speckle also leads to enhanced image bias error, as it causes the intensity profile to change as shown in FIG. 5. Therefore, if there is speckle noise, the intensity profile 36 of FIG. 4 will appear as the sampled intensity profile 58 with sampling error and added speckle noise at 56.

Figure 6:
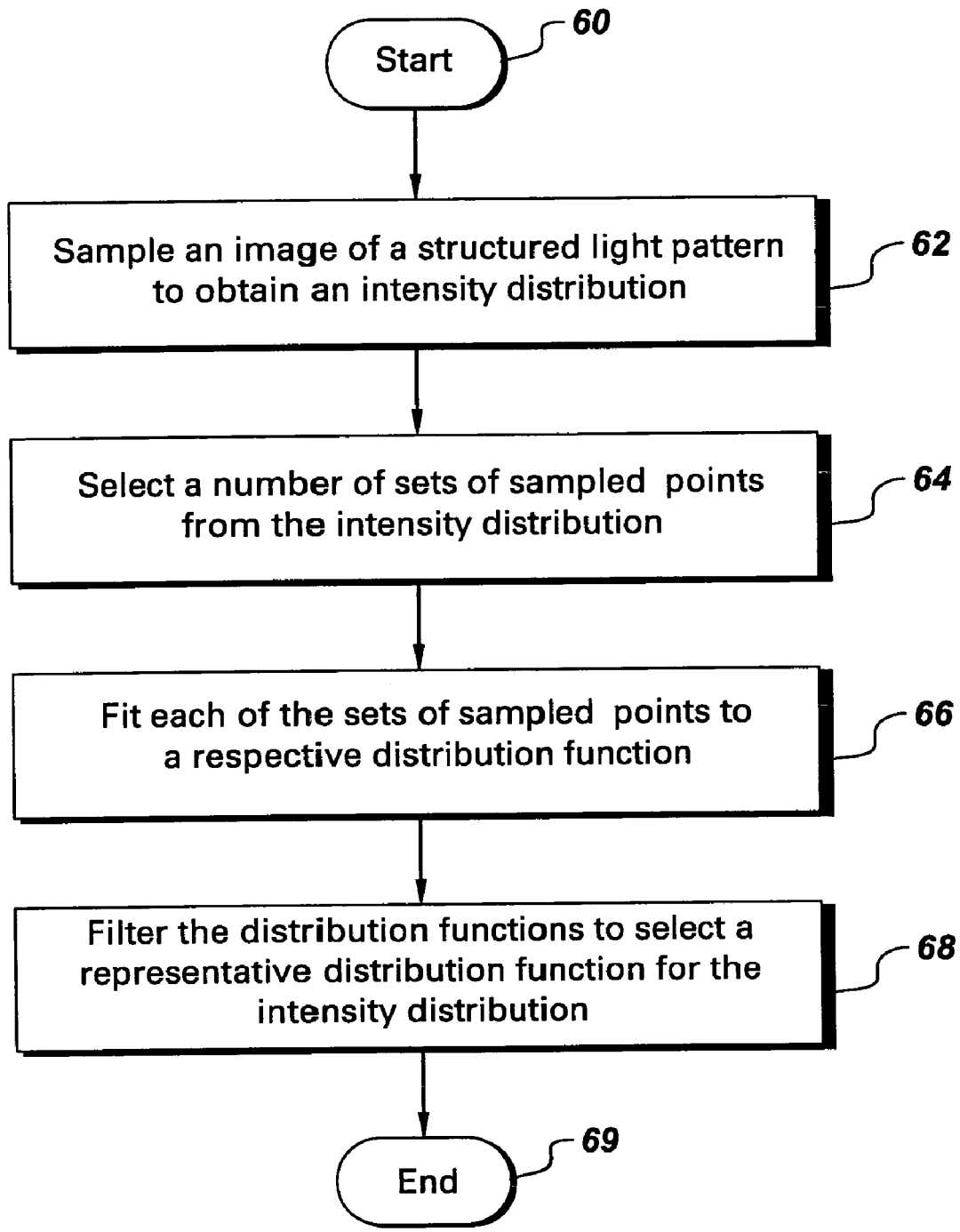
FIG. 6 is a flowchart that illustrates one aspect of an image processing method for structured light profiling for use in the system of FIG. 1.

In order to reduce sampling error and speckle noise, an imaging processing method is provided. FIG. 6 illustrates one aspect of an image processing method for structured light profiling for use in the system 10 of FIG. 1. The method includes acquiring the image of the structured light pattern of a part. The structured light pattern includes at least one laser stripe, and the intensity distribution is an intensity profile across one of the laser stripes. Referring to the flowchart of FIG. 6, the method starts at 60 with an image 28, which is sampled to obtain an intensity distribution of the structured light pattern at step 62. Next, at step 64, a number of sets of sampled points are selected from the intensity distribution, where each of the respective sets includes a number of sampled points. In one example each of the sets of sampled points includes at least three sampled points. In Step 66 each of the sets of sampled points is fit to a respective distribution function. In one example each of the distribution functions is a Gaussian distribution. It is found that fitting the intensity profile for a curved surface with a Gaussian distribution leads to reducing sampling error. In Step 68 the distribution functions are filtered to select a representative distribution function with reduced effect of speckle noise for the intensity distribution. The method concludes at 69 with an output of the representative distribution function, which is further processed to reconstruct the three dimensional profile of the part.

Figure 7:
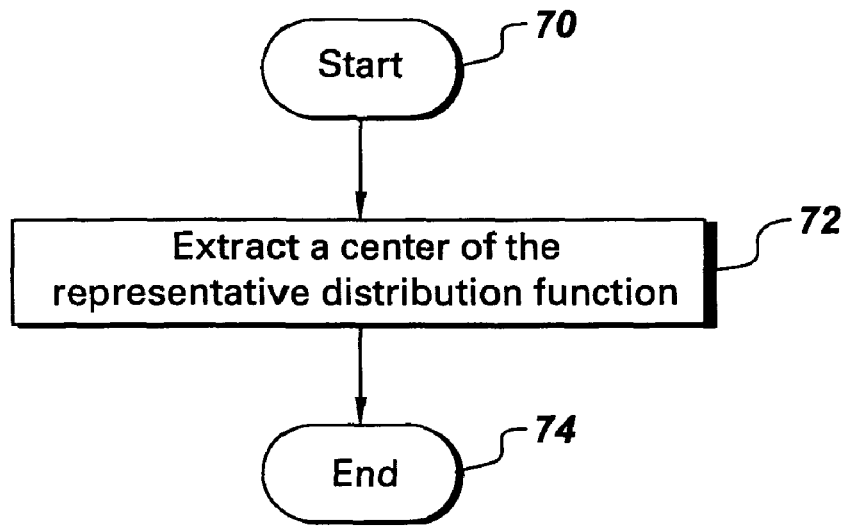
FIG. 7 illustrates a flowchart for determining the position of laser stripe by using a center of the representative distribution function according to an aspect of the image processing technique.

FIG. 7 illustrates additional aspects of the image processing method. For this embodiment, the image processing method also includes extracting a center of the representative distribution function, which is shown as step 72 in FIG. 7. The input 70 to the process illustrated in FIG. 7 is the representative distribution function, and the output 74 is the center of the representative distribution function depicting the position of the laser stripe on the complex part. The center of the representative distribution function may be extracted, for example, using zero-crossing. The exemplary fitting method, according to an aspect of the present technique, fits sets of three sampled points to respective distribution functions, in order to calculate the center of the representative distribution function, as mentioned above. As would be appreciated by one skilled in the art, more than three sampled points can be used as well.

Figure 8:
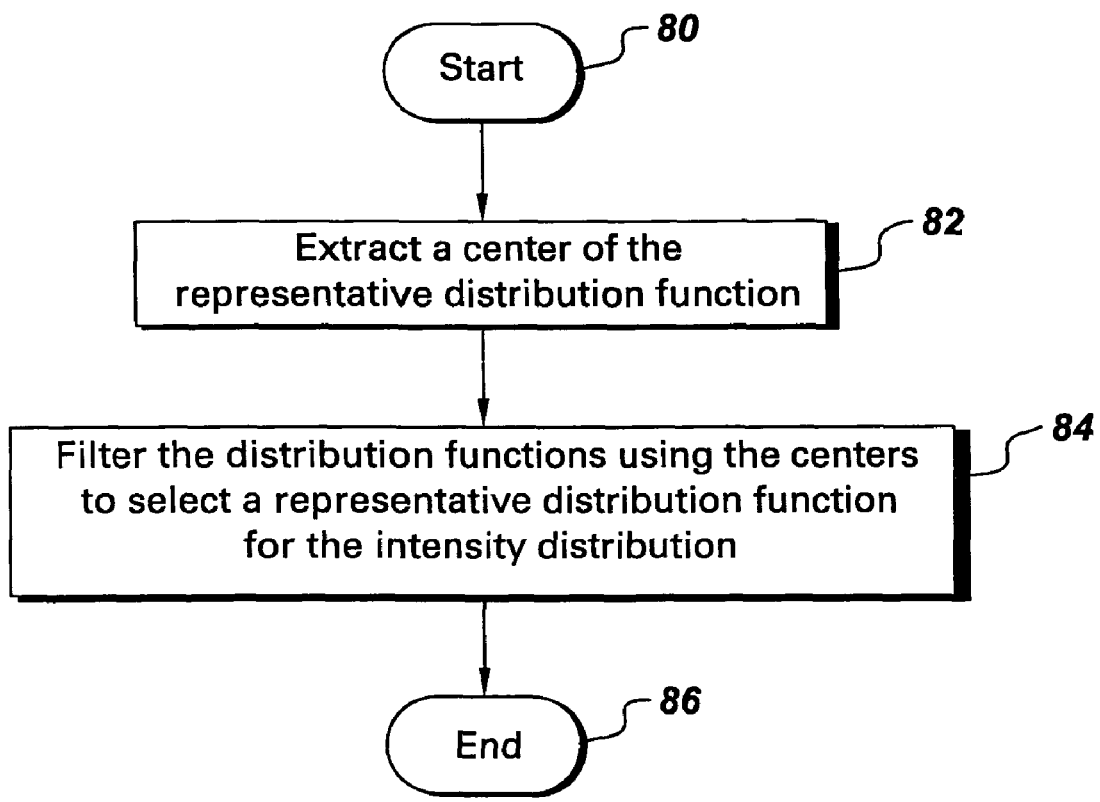
FIG. 8 illustrates a flowchart for determining the position of laser stripe by using centers of distribution functions according to an aspect of the image processing method.

FIG. 8 illustrates another embodiment of the image processing method. For this embodiment, a center is extracted for each of the distribution functions as shown in step 82 of FIG. 8. The centers may be extracted using zero-crossing. The input 80 to this process will be the distribution functions, which are generated at step 66 in FIG. 6. The filtering step includes using these centers in the subsequent step 84. For example, multiple centers may be calculated using different sets of three points from the intensity profile. If the multiple centers are close, the average or median can be used as a fitted center of the Gaussian distribution. Namely, for this example, the filtering step includes selecting a median of the centers, and the representative distribution function corresponds to the median of the centers. A histogram may be used to determine the median. Alternatively, the centers may be sorted to determine the median. As will be appreciated by one skilled in the art, these filtering techniques select the representative center for the distribution functions that depicts the position of laser stripe center on the complex part.

In case there is a speckle which can be observed as an outlier on the intensity profile, the corresponding center using the outlier can be easily discarded and the speckle noise can be addressed. This is indicated in FIG. 8, in which step 84 of filtering includes rejecting a number of distribution functions that involve outliers. A filtering example is discussed with reference to FIG. 5. As shown in FIG. 5, there is an added speckle at sampling point 4 (total 9 points) and the calculated seven centers are, 0, −6.06, 0.16, −0.32, 0, 0, 0. For this filtering example, a closest group amongst the calculated centers is selected and zero is selected. The statistical analysis methods can further use histograms to screen speckle noise using the median value. Beneficially, this fitting requires only three sampled points at a time to calculate multiple values for the centers which can be used for filtering without compromising computation speed.

As noted above, the flowcharts illustrated in FIG. 6, FIG. 7, and FIG. 8 describe the aspects of the method discussed hereinabove. The foregoing flow charts also show the functionality and operation of the method and the system for reconstructing a three dimensional profile of a part. In this regard, each block/component represents a module, segment, or portion of code, which comprises one or more executable instructions for implementing the specified logical functions. It should also be noted that in some alternative implementations, the functions noted in the blocks may occur out of the order noted in the figures or, for example, may in fact be executed substantially concurrently or in the reverse order, depending upon the functionality involved. Also, one of ordinary skill in the art will recognize that additional blocks may be added. Furthermore, the functions can be implemented in programming languages such as C++ or JAVA; however, other languages can be used.

The various embodiments and aspects of the invention described above comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

The various aspects of the technique described hereinabove have utility in industrial as well as medical environments. The methods can be used for non-contact measurement of complex parts e.g. aircraft parts for inspection, in the extrusion process in the steel industry and other high temperature manufacturing environments where contact measurement of a part is difficult. These methods are also useful in medical fields for surgery planning, where these may be used for profiling the different parts of a human body to have precision in surgery.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An image processing method for structured light profiling, said method comprising:
    sampling an image of a structured light pattern to obtain an intensity distribution;
    selecting a plurality of sets of sampled points from the intensity distribution, wherein each of the respective sets comprises a plurality of sampled points;
    fitting each of the sets of sampled points to a respective Gaussian distribution function; and
    filtering the Gaussian distribution functions to select a representative distribution function for the intensity distribution.

2. The image processing method of claim 1, further comprising extracting a center of the representative distribution function.

3. The image processing method of claim 2, wherein said extracting the center comprises using zero-crossing.

4. The image processing method of claim 1, wherein each of the sets of sampled points comprises at least three sampled points.

5. The image processing method of claim 1, wherein each of the distribution functions comprises a Gaussian distribution.

6. The image processing method of claim 1, further comprising extracting a respective center for each of the distribution functions, wherein said filtering includes using the centers.

7. The image processing method of claim 6, wherein said extracting comprises using zero-crossing.

8. The image processing method of claim 6, wherein said filtering includes rejecting a plurality of outliers.

9. The image processing method of claim 6, wherein said filtering includes selecting a median of the centers, wherein the representative distribution function corresponds to the median.

10. The image processing method of claim 9, wherein said filtering further includes using a histogram to determine the median.

11. The image processing method of claim 9, wherein said filtering further includes sorting the centers to determine the median.

12. The image processing method of claim 1, wherein said structured light pattern comprises at least one laser stripe, and wherein said intensity distribution is an intensity profile across one of the laser stripes.

13. The image processing method of claim 1, further comprising acquiring the image of the structured light pattern of a part.

14. The image processing method of claim 13, further comprising reconstructing a three dimensional profile of the part, using the representative distribution function.

15. An image processing method for structured light profiling, said method comprising:
    sampling an image of a structured light pattern to obtain an intensity distribution;
    selecting a plurality of sets of sampled points from the intensity distribution, wherein each of the sets comprises at least three sampled points;
    fitting each of the sets of sampled points to respective Gaussian distribution functions;
    extracting a center for each of the Gaussian distribution functions;
    filtering the Gaussian distribution functions by using the centers to select a representative distribution function for the intensity distribution.

16. The image processing method of claim 15, wherein said extracting comprises using zero-crossing.

17. The image processing method of claim 15, wherein said filtering includes selecting a median of the centers, wherein the representative distribution function corresponds to the median.

18. An image processing method for reconstructing a three dimensional profile of a part, said method comprising:
    projecting at least one laser beam on the part;
    acquiring an image of a structured light pattern of the part;
    sampling the image to obtain an intensity distribution;
    selecting a plurality of sets of sampled points from the intensity distribution, wherein each of the sets comprises at least three sampled points;

fitting each of the sets of sampled points to a respective Gaussian distribution function;

extracting a center for each of the Gaussian distribution functions;

filtering the Gaussian distribution functions by using the centers to select a representative distribution function for the intensity distribution; and using the representative distribution function for the intensity distribution to generate the three dimensional profile of the part.

19. The image processing method of claim 18, wherein said filtering includes selecting a median of the centers, wherein the representative distribution function corresponds to the median.

20. A system for obtaining a three dimensional profile of a part using a structured light pattern, said system comprising:

a source of structured light positioned at a predetermined distance from a part, wherein the source projects a beam of structured light to illuminate the part;

at least one imaging device configured to acquire an image of a structured light pattern of the part, wherein the at least one imaging device is positioned such that an angle of view of the imaging device is different from an angle of illumination of the source; and a processor coupled to the at least one imaging device, wherein the processor is configured for sampling the image of a structured light pattern to obtain an intensity distribution;

selecting a plurality of sets of sampled points from the intensity distribution, and wherein each of the sets comprises at least three sampled points;

fitting each of the sets of sampled points to respective Gaussian distribution functions;

extracting a center for each of the Gaussian distribution functions;

filtering the Gaussian distribution functions by using the centers to select a representative distribution function for the intensity distribution; and reconstructing a three dimensional profile of the part, using the representative distribution function.

21. The system of claim 20, wherein said processor is further configured for selecting a median of the respective centers, wherein the representative distribution function corresponds to the median.

22. A computer readable medium for storing and/or transmitting instructions that, when executed by a computer, perform a method for image processing for structured light profiling, said method comprising:

sampling an image of a structured light pattern to obtain an intensity distribution;

selecting a plurality of sets of sampled points from the intensity distribution, wherein each of the sets comprises a plurality of sampled points;

fitting each of the sets of sampled points to a respective distribution function; and filtering the distribution functions to select a representative distribution function for the intensity distribution.

23. The computer readable medium of claim 22, wherein each of the sets of sampled points comprises at least three sampled points.

24. The computer readable medium of claim 22, wherein each of the distribution functions comprises a Gaussian distribution.

25. The computer readable medium of claim 22, wherein the method further includes extracting a respective center for each of the distribution functions, wherein said filtering includes using the centers.

26. The computer readable medium of claim 25, wherein the extracting comprises using zero-crossing.

27. The computer readable medium of claim 25, wherein the filtering includes selecting a median of the centers, wherein the representative distribution function corresponds to the median.

* * * * *